(12) United States Patent
Inoue et al.

(10) Patent No.: US 8,255,560 B2
(45) Date of Patent: Aug. 28, 2012

(54) SYSTEM FOR TRANSMITTING AND RECEIVING PACKETS

(75) Inventors: Tomohiro Inoue, Kawasaki (JP); Yuichiro Ajima, Kawasaki (JP); Shinya Hiramoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 347 days.

(21) Appl. No.: 12/485,529

(22) Filed: Jun. 16, 2009

(65) Prior Publication Data

US 2009/0327826 A1 Dec. 31, 2009

(30) Foreign Application Priority Data

Jun. 30, 2008 (JP) ................................ 2008-170487

(51) Int. Cl.
*G06F 15/16* (2006.01)
(52) U.S. Cl. .................... 709/232; 709/250; 709/237
(58) Field of Classification Search ............... 709/206, 709/232, 237, 250
See application file for complete search history.

(56) References Cited

U.S. PATENT DOCUMENTS

| | | | |
|---|---|---|---|
| 5,953,418 A * | 9/1999 | Bock et al. ..................... 380/240 |
| 6,931,581 B1 | 8/2005 | Cassiday et al. |
| 2001/0030963 A1 | 10/2001 | Yoshimura et al. |
| 2002/0059464 A1 | 5/2002 | Hata et al. |
| 2002/0191614 A1 | 12/2002 | Ido et al. |
| 2004/0202167 A1 | 10/2004 | Jonsson et al. |
| 2008/0195912 A1 * | 8/2008 | Mende et al. ................. 714/752 |

FOREIGN PATENT DOCUMENTS

| | | |
|---|---|---|
| JP | 09-162873 | 6/1997 |
| JP | 2002-135362 | 5/2002 |
| WO | 03/030437 | 4/2003 |

OTHER PUBLICATIONS

Chinese Office Action for corresponding Chinese Application 200910146399.3; issued May 25, 2011.
Korean Office Action for corresponding Korean Application 10-2009-0058261; dated Jan. 7, 2011.
Japanese Office Action for corresponding Japanese Application 2008-170487; mailed Dec. 6, 2011.

* cited by examiner

*Primary Examiner* — Kristie Shingles
(74) *Attorney, Agent, or Firm* — Staas & Halsey LLP

(57) ABSTRACT

A system has a transmitter for transmitting a sequence of packets, the transmitter has a first counter for storing a first sequence number, a first generating unit for generating an error check code for checking an error in each of the packets on the basis of the header and the data in each of the packets and the first sequence number, and a transmitting unit for transmitting each of the packet together with each of the error check code and a receiver has a second counter for storing a second sequence number, a second generating unit for generating an error check code for checking an error in each of the packets on the basis of the header and the data in each of the packets received from the transmitter and the second sequence number and an error check unit for checking an error in the sequence of the packet.

5 Claims, 17 Drawing Sheets

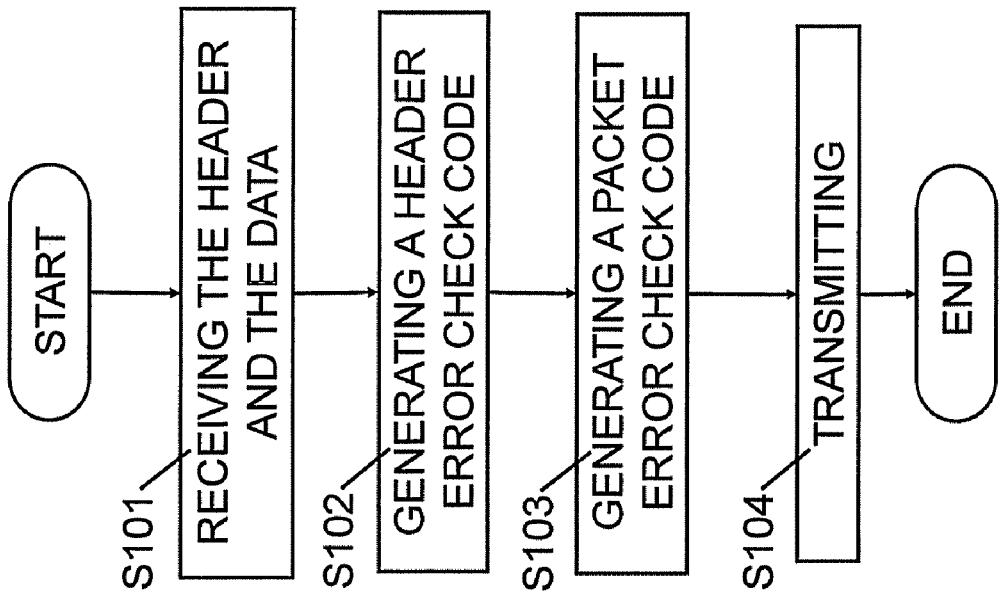

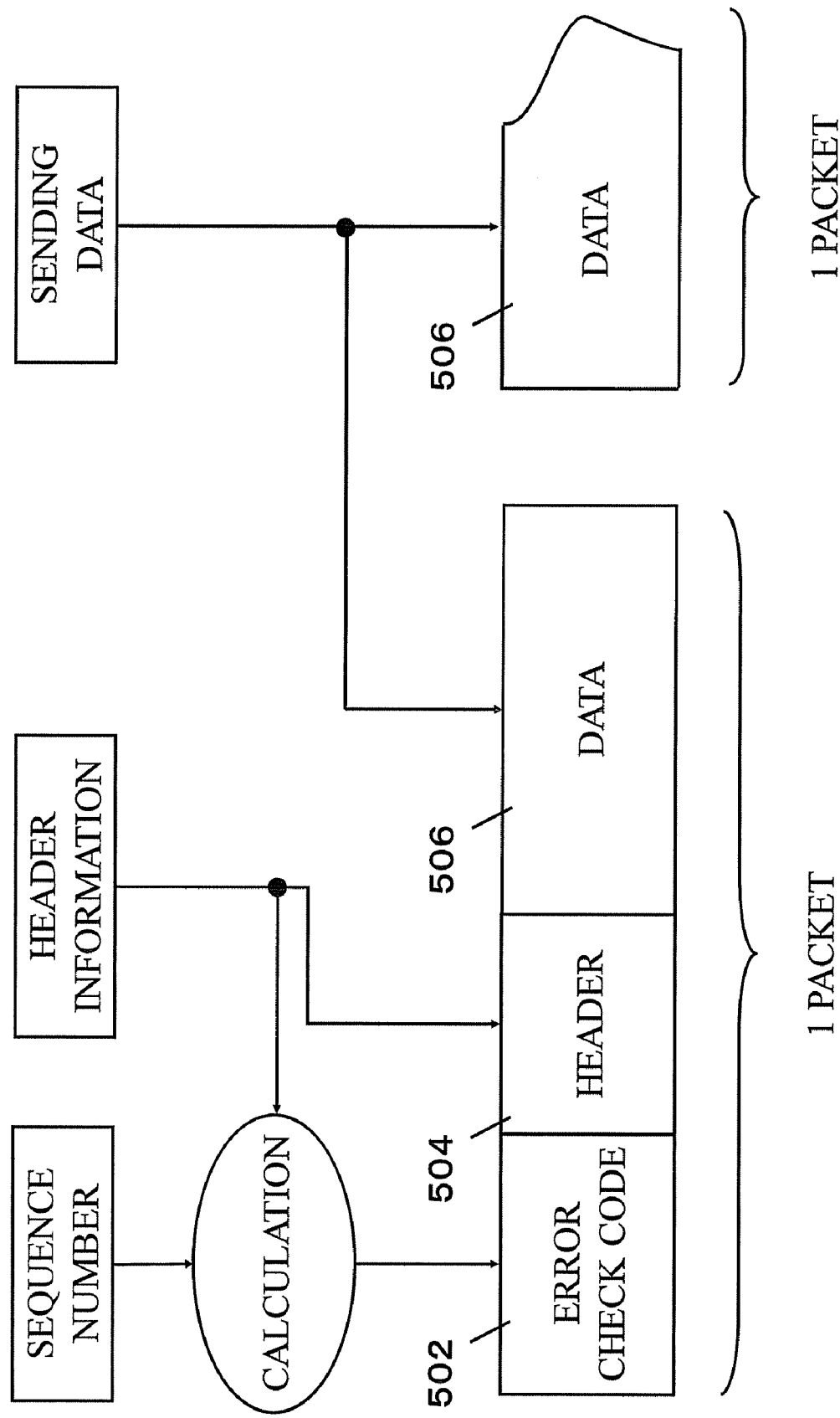

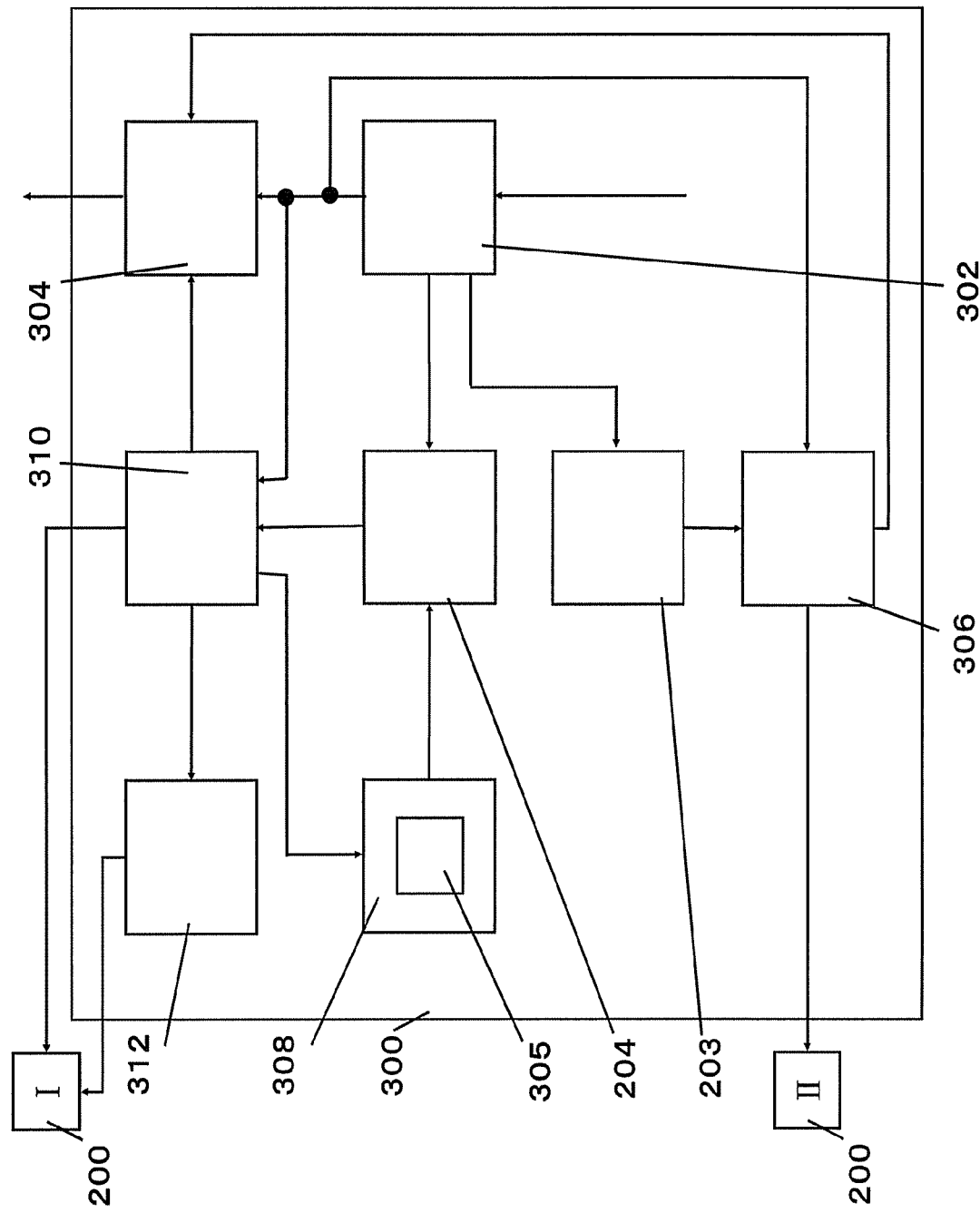

SYSTEM FOR TRANSMITTING AND RECEIVING PACKETS

CROSS-REFERENCE TO RELATED APPLICATION

This application is based upon and claims the benefit of priority of the prior Japanese Patent Application No. 2008-170487, filed on Jun. 30, 2008, the entire contents of which are incorporated herein by reference.

FIELD

A certain aspect of the embodiments discussed herein is related to a transmitting/receiving circuit including a transmitting circuit for transmitting a packet having data and header information and a receiving circuit for receiving a packet.

BACKGROUND

In a packet transmitting/receiving circuit, the packet includes divided data and header information attached to the divided data. The header information includes information needed until the packet reaches a destination such as the destination information of the packet, a sequence number and a header error check code. The error check code is added to allow detection of whether an error has occurred in the packet or not. When the packet is received, the receiving circuit judges whether an error check code generated from the data coincides with the error check code added to the data or not. The receiving circuit detects whether an error has occurred in the packet or not.

Here, in a case that an error is found in the packet, the receiving circuit requests the transmitting circuit to re-transmit the packet. In a case that the packet is to be re-transmitted, information on up to which packet the receiving circuit has normally received and on which packet is requested to be re-transmitted to the transmitting circuit is needed. The transmitting/receiving circuit uses sequence numbers as the information concerned. The sequence numbers are added to the respective packets in order to confirm the order of the packet concerned and presence or absence of a missing packet. Control is performed such that the sequence number of the packet transmitted from the transmitting circuit matches the sequence number of the packet received by the receiving circuit. The transmitting circuit has a transmission counter for counting the sequence number and likewise the receiving circuit has a reception counter for counting the sequence number. When the packet transmitted from the transmitting circuit is normally received, the receiving circuit increments the reception counter. The receiving circuit transmits a signal indicative of normal reception of the packet to the transmitting circuit. The transmitting circuit receives this signal. Then the transmitting circuit increments the transmission counter. Upon transmission of the packet from the transmitting circuit, the value of the transmission counter coincides with the value of the reception counter.

In order to realize confirmation of transmission/reception of the packet concerned and controlling of packet re-transmission, the error check codes and the sequence numbers are needed. However, the sequence number has been added to the header information as redundant information, in spite of the fact that each of the transmitting circuit and the receiving circuit respectively manages the sequence number of the packet to be transmitted and the sequence number of the packet to be received.

Japanese Laid-open Patent Publication No. 2002-026963 has been proposed.

SUMMARY

According to an aspect of an embodiment, a system has a transmitter for transmitting a sequence of packets, each of the packets including a header and data, the transmitter has a first counter for storing a first sequence number of the packets to be transmitted, a first generating unit for generating an error check code for checking an error in each of the packets on the basis of the header and the data in each of the packets and the first sequence number corresponding to each of the packets, and a transmitting unit for transmitting each of the packet together with each of the error check code and a receiver for receiving the packets, the receiver has a second counter for storing a second sequence number of the packets received from the transmitter, a second generating unit for generating an error check code for checking an error in each of the packets on the basis of the header and the data in each of the packets received from the transmitter and the second sequence number corresponding to each of the packets and an error check unit for checking an error in the sequence of the packet by comparing the error check code generated by the second generating unit with the error check code received from the transmitter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a flowchart showing a transmitting process in the first embodiment;

FIG. 6 is a diagram showing a method of generating a header error check code;

FIG. 7 is a structural diagram of a receiving circuit in the first embodiment;

DESCRIPTION OF EMBODIMENTS

Preferred embodiments of the present art will be described with reference to the accompanying drawings.

Figure 1:
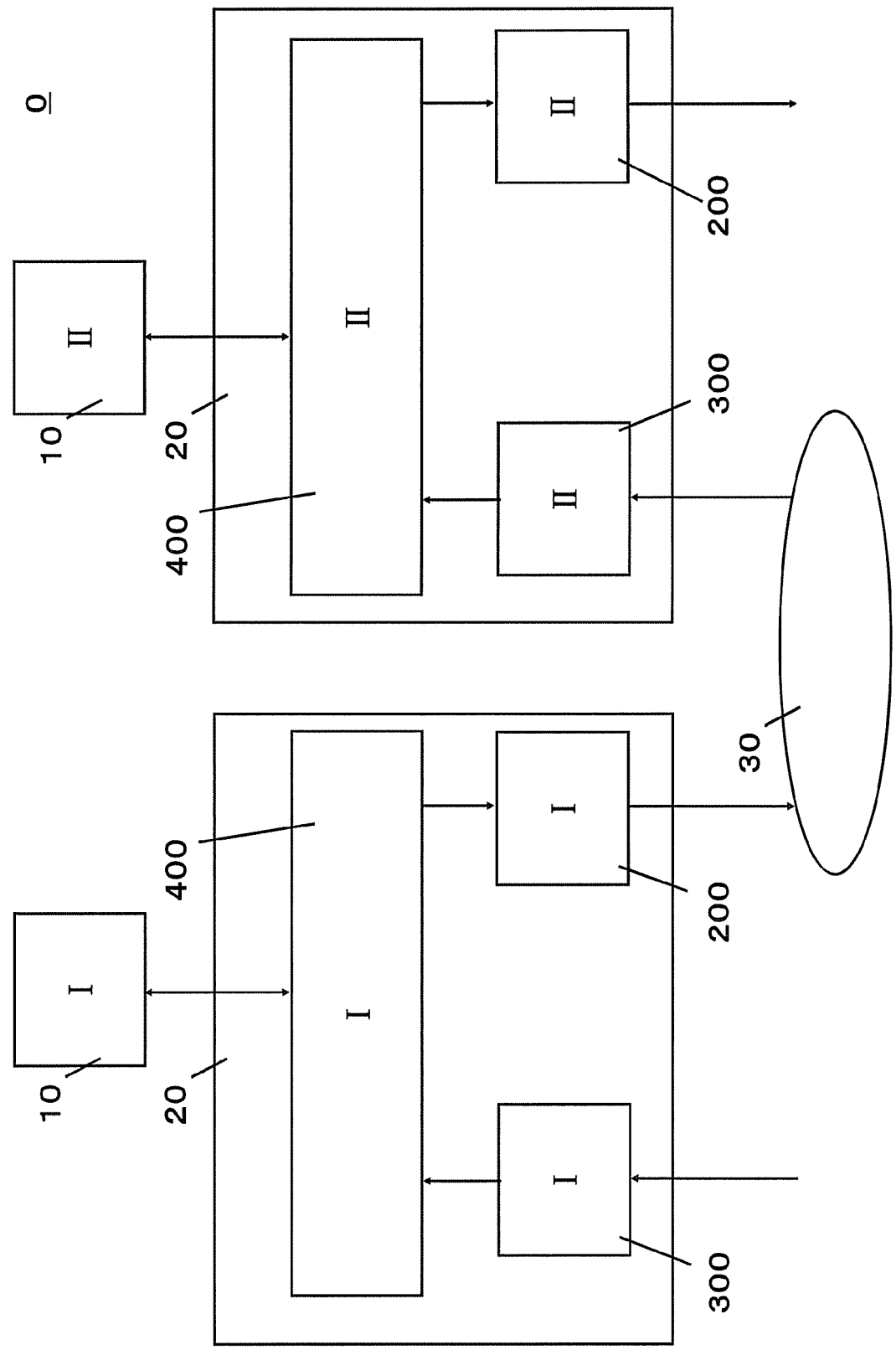
FIG. 1 is a structural diagram of a network system.

First Embodiment:

FIG. 1 shows a structural diagram of a network system 0 according to the first embodiment. Data is transmitted or received between nodes via a network 30 and transmitters/receivers 20 of the respective nodes 10. The network system 0 according to this embodiment ensures that a correct packet order is guaranteed. The network 30 according to this embodiment is a type for performing confirmation of transmission and controlling re-transmission at a data link layer level.

The transmitter/receiver 20 includes a packet transmitting circuit 200, a network interface circuit 400 and a packet receiving circuit 300. The packet transmitting circuit 200 transmits a packet to the transmitter/receiver 20 of the other node 10 via the network 30. The packet receiving circuit 30 receives the packet from the transmitter/receiver 20 of the other node 10 via the network 30. The network interface circuit 400 transmits the packet to the node 10 and receives a packet therefrom.

In this embodiment, in order to increase the speed at which a packet is transferred, cut-through transfer is adopted. In the cut-through transfer, a packet is divided into flits. The packet is transferred in units of flits so divided. The transmitter/receiver 20 sequentially receives the flits. When the header of the packet is wholly acquired, the transmitter/receiver 20 refers to the header concerned to acquire information on the destination to which the packet is to be transferred. Then, the transmitter/receiver 20 starts transferring the packet to the packet's destination.

Figure 2:
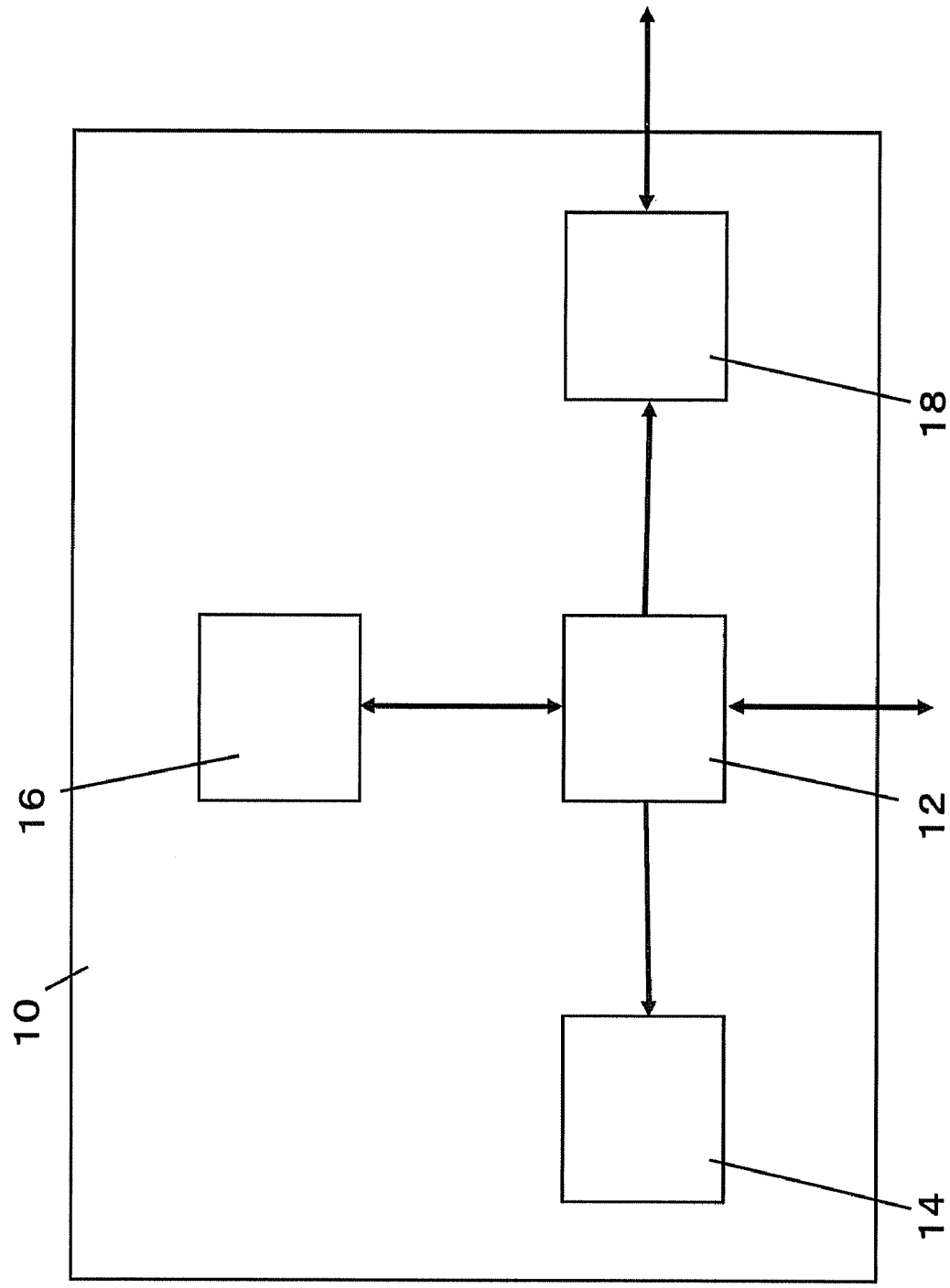
FIG. 2 is a structural diagram of a node.

FIG. 2 shows an example of the structure of the node 10. The node 10 has a system control unit 12, a central processing unit (CPU) 14, a memory 16 and an input/output (I/O) interface 18. The CPU 14 executes data processing. The memory 16 stores data therein. The system control unit 12 is connected to the transmitter/receiver 20 to perform packet transmission or reception with the transmitter/receiver 20. The I/O interface 18 is used for connection to other devices.

Figure 3:
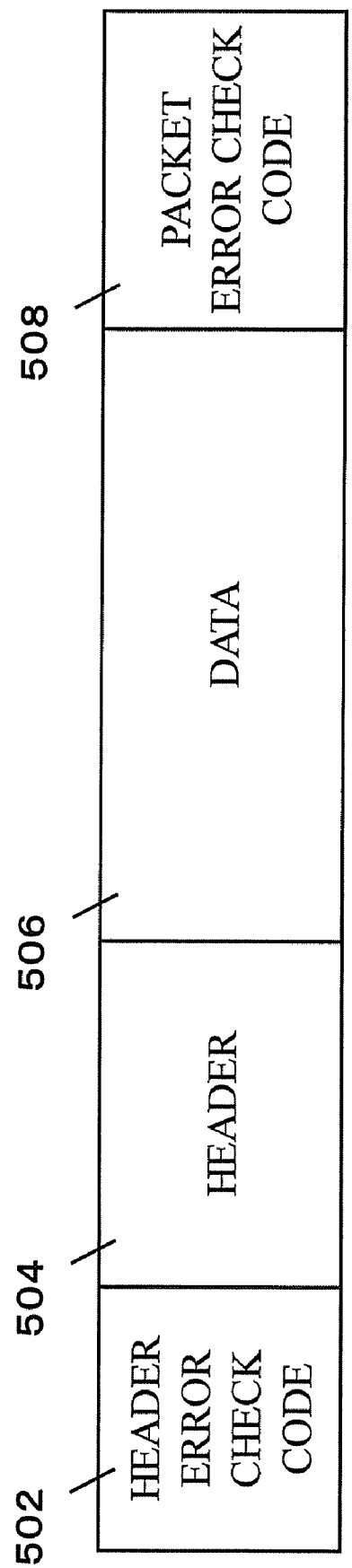
FIG. 3 is a diagram showing a packet format in a first embodiment.

FIG. 3 shows a packet format of a packet 500 to be transmitted or received in this embodiment. In a packet communication system, first, data to be transmitted or received is divided into small pieces of data called packets. Next, the packets are transferred from the node of a source to the node of a destination.

The packet 500 has a header error check code 502, a header 504, data 506 and a packet error check code 508. The header error check code 502 is an error check code in which a sequence number generated by a method of this embodiment is folded. The header error check code 502 is used to check an error in the header. The header 504 has information such as the address of the source of the packet, the address of the sink of the packet, the packet type and the packet length. The data 506 includes given information. The packet error check code 508 is used to check an error in the data 506. The lengths of respective fields of the packet 500 are, for example, as follows. The header error check code 502 has a length of 2 bytes, likewise, the header 504 has a length of 5 bytes, the data 506 has a variable length varying in units of 8 bytes and the packet error check code 508 has a length of 4 bytes.

In addition, in this embodiment, an STP code indicative of the head of the packet is added to the head 8-byte field of the packet 500. An END code indicative of the end of the packet is added to the end 8-byte field of the packet. END information indicative of a normal packet or EDB information indicative of an error-included packet is written into the END code. The receiving circuit 302 refers to the END code to detect the end of the packet and to judge whether the packet is a normal packet or not.

Figure 4:
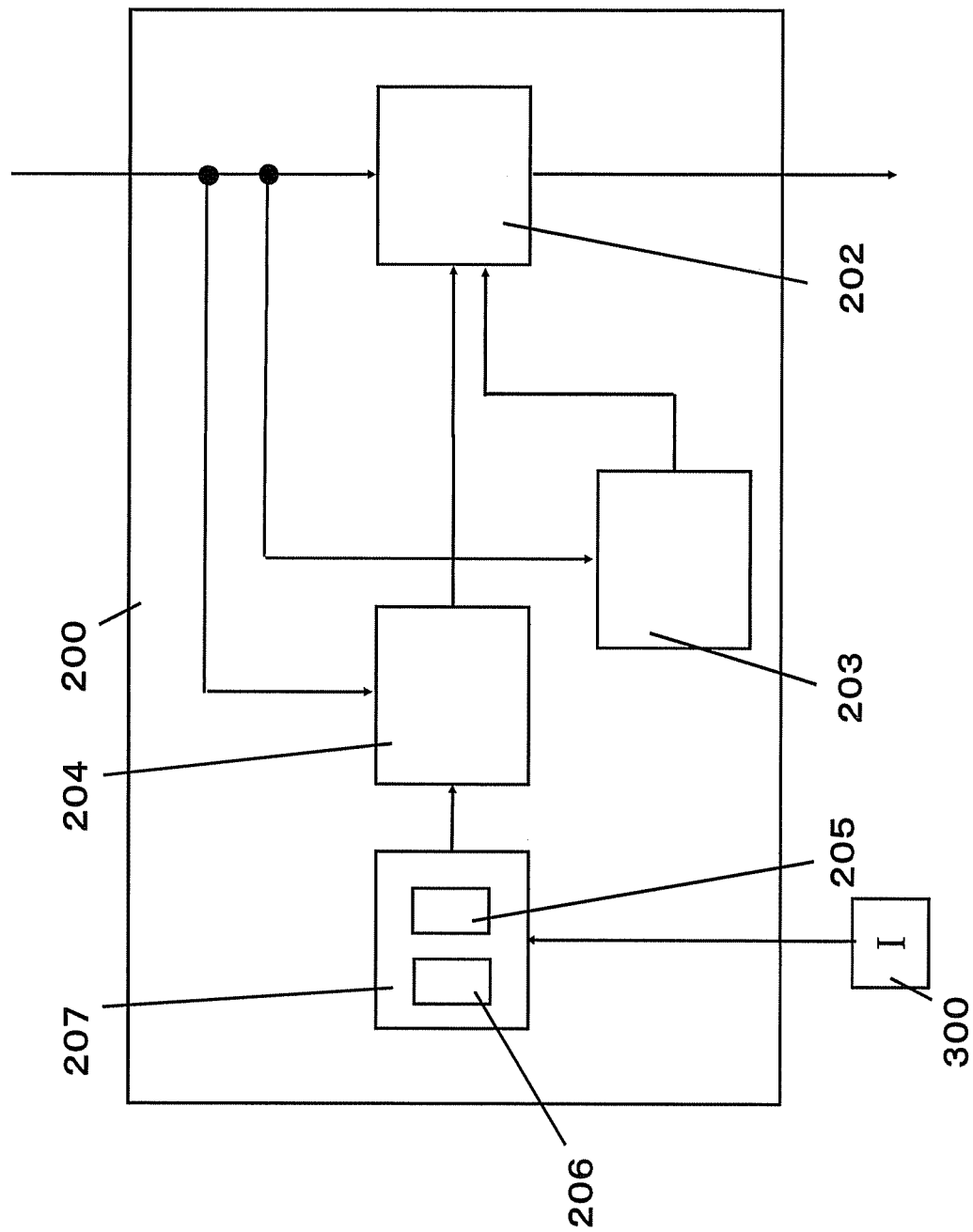
FIG. 4 is a structural diagram of a transmitting circuit in the first embodiment.

FIG. 4 shows a structure of the packet transmitting circuit 200 according to this embodiment. The packet transmitting circuit 200 includes a transmitting circuit 202, a header error check code generating circuit 204, a packet error check code generating circuit 203 and a transmission sequence number controlling circuit 207.

The header and the data are inputted into the packet transmitting circuit 200 via the network interface circuit 400 described with reference to FIG. 1. The transmission sequence number controlling circuit 207 has a first transmission counter 205 for storing the sequence number of the packet to be transmitted next and a second transmission counter 206 for storing the sequence number of the packet that the reception side could normally receive so as to manage the sequence numbers of packets to be transmitted. When the packet transmitting circuit 200 transmits a packet, the first transmission counter 205 is incremented. The second transmission counter 206 is incremented to the sequence number of the packet that the packet receiving circuit 300 could normally receive.

The header error check code generating circuit 204 generates a header error check code from the header inputted from the network interface circuit 400 into the packet transmitting circuit 200 and the sequence number indicated by the first transmission counter 205. The packet error check code generating circuit 203 generates a packet error check code from the data inputted from the network interface circuit 400 into the packet transmitting circuit 200. As an algorithm for generating each error check code, a given algorithm, for example, such as a CRC (Cyclic Redundancy Check) algorithm may be used in the header error check code generating circuit 204 and the packet error check code generating circuit 203. The transmitting circuit 202 transmits the header error check code generated by the header error check code generating circuit 204, the header, the data and the packet error check code generated by the packet error check code generating circuit 203 to the node of the destination via the network 30 according to the packet format.

A packet transmitting process will be described with reference to FIG. 5. At step S101, the transmitting circuit 202 receives the header and the data. Then, the process proceeds to step S102.

At step S102, the header error check code generating circuit 204 generates a header error check code from the sequence number indicated by the first transmission counter 205 and the header received by the transmitting circuit 202. Then, the process proceeds to step S103.

At step S103, the packet error check code generating circuit 203 generates a packet error check code from the data received by the transmitting circuit 202. Then, the process proceeds to step S104.

At step S104, the transmitting circuit 202 transmits the header error check code, the header, the data and the packet error check code to the network 30 according to the packet format. Thus, the process is completed.

FIG. 6 is a conceptual diagram illustrating a method of generating the header error check code in this embodiment. As shown in FIG. 6, the header error check code in this embodiment is generated by calculation using the sequence number and the packet header information.

FIG. 7 shows a structure of the packet receiving circuit 300 in this embodiment. The packet receiving circuit 300 includes a receiving circuit 302, a buffer 304, the header error check code generating circuit 204, the packet error check code generating circuit 203, a reception sequence number controlling circuit 308, a header error check code comparing circuit 310, a packet error check code comparing circuit 306 and a re-transmission controlling circuit 312.

The packet transmitted from the packet transmitting circuit 200 via the network 30 is inputted into the packet receiving circuit 300. The receiving circuit 302 receives the packet and outputs the received packet to the buffer 304. The receiving circuit 302 also outputs the header of the received packet to the header error check code generating circuit 204, outputs the header error check code of the received packet to the header error check code comparing circuit 310, outputs the data of the received packet to the packet error check code generating circuit 203 and outputs the packet error check code of the received packet to the packet error check code comparing circuit 306.

The buffer 304 stores therein the packet inputted from the receiving circuit 302. The reception sequence number controlling circuit 308 has a reception counter 305 to manage the sequence number of the received packet. The reception counter 305 indicates the same value as that indicated by the first transmission counter 205 in the reception counter's initial state.

The header error check code generating circuit 204 generates the header error check code from the header inputted from the receiving circuit 302 and the sequence number indicated by the reception counter 305.

The packet error check code generating circuit 203 generates the packet error check code from the data inputted from the receiving circuit 302. As an algorithm for generating each error check code, a given algorithm, for example, such as the CRC algorithm may be used in the header error check code generating circuit 204 and the packet error check code generating circuit 203.

The header error check code generating circuit 204 outputs the generated header error check code to the header error check code comparing circuit 310. The header error check code comparing circuit 310 compares the header error check code inputted from the receiving circuit 302 with the header error check code inputted from the header error check code generating circuit 204. In a case that, as a result of comparison, the head error check code inputted from the receiving circuit 302 matches the header error check code inputted from the header error check code generating circuit 204, the header error check code comparing circuit 310 outputs a signal indicative of matching of these codes to the buffer 304 and the reception sequence number controlling circuit 308. In addition, in this case, that is, when these header error check codes match each other, the header error check code comparing circuit 310 transmits an ACK packet indicating that a normal packet has been received to the transmission sequence number controlling circuit 207 of the transmitter/receiver 20 of the node 10 of the source from which the packet has been transmitted.

When the signal indicative of matching of these codes is inputted into the reception sequence number controlling circuit 308 from the header error check code comparing circuit 310, the reception counter 305 is incremented. In addition, when the ACK packet is received by the transmission sequence number controlling circuit 207, the second transmission counter 206 is incremented to the sequence number in the ACK packet. In a case that the packet is normally transmitted/received, the first transmission counter 205 is incremented when the packet is transmitted and the reception counter 305 is incremented when the packet is received. Thus, the first transmission counter 206 indicates the same value as that indicated by the reception counter 305.

On the other hand, in a case that, as a result of comparison of these codes, the header error check code inputted from the receiving circuit 302 does not match the header error check code inputted from the header error check code generating circuit 204, the header error check code comparing circuit 310 outputs a signal indicative of non-matching of these codes to the re-transmission controlling circuit 312. The re-transmission controlling circuit 312 receives this signal and transmits an NAK packet indicating that a normal packet could not be received to the transmission sequence number controlling circuit 207 of the transmitter/receiver 20 of the node 10 of the source. When the transmission sequence number controlling circuit 207 receives the NAK packet, the second transmission counter 206 is incremented to the sequence number of the normally received packet in the NAK packet. The transmitting circuit 202 performs a process of re-transmitting the packet of the sequence number which is indicated by the first transmission counter 205, coming after the "sequence number+one" packet indicated by the second transmission counter 206.

Re-transmission of the packet is requested in the following cases, for example, a case where a bit error is detected in the header of a packet concerned, a case where the sequence number of the header of the packet does not match a sequence number expected by the packet receiving circuit 300, a case where no bit error is found in the sequence number, but the previous packet is missing, a case where a bit error is found in the sequence number and a case where a bit error is found in the data main frame of the packet. In addition, the packet re-transmission is requested not only in a case that a bit error is found in the data of the packet main frame, but also in cases that a bit error is found in the header and the sequence numbers are discrete.

The packet error check code generating circuit 203 outputs the generated packet error check code to the packet error check code comparing circuit 306. Then, the packet error check code comparing circuit 306 compares the packet error check code inputted from the receiving circuit 302 with the packet error check code inputted from the packet error check code generating circuit 203. In a case that, as a result of comparison, the packet error check code inputted from the receiving circuit 302 matches the packet error check code inputted from the packet error check code generating circuit 203, the circuit 306 outputs a signal indicative of matching of these codes to the buffer 304. On the other hand, in a case that, as a result of comparison, the packet error check code inputted from the receiving circuit 302 does not match the packet error check code inputted from the packet error check code generating circuit 203, a signal indicative of non-matching of these codes is outputted to the buffer 304. When this signal is inputted into the buffer 304, the packet stored in the buffer 304 is deleted.

In a case that the packet error check code generated by the packet error check code generating circuit 203 does not match a bit-inverted code of the packet error check code of the packet received by the receiving circuit 302, the packet error check code comparing circuit 306 outputs a signal indicative of non-matching of these codes to the packet transmitting circuit 200 of the transmitter/receiver 20 connected to the node 10 of the destination to which the packet is to be transmitted.

The transmitting circuit 202 of the transmitter/receiver 20 connected to the node 10 of the destination of the packet receives the signal and writes EDB indicating that the error is included in the packet into the END code of the packet. In addition, when this signal is received, the transmitting circuit 202 asks the packet error check code generating circuit 203 to generate a packet error check code obtained by bit-inverting the packet error check code of a normal packet. Then, the transmitting circuit 202 transmits a packet in which EDB is written into the END code and to which the packet error check code obtained by bit-inverting the error check code of the normal code is added to the network. Thus, the receiving circuit 302 can detect the end of the packet and judge whether the received packet is normal or not in reference to the END code. The receiving circuit 302 can also judge whether the packet is to be invalidated or not by judging whether the packet error check code of the received packet is bit-inverted or not.

In the cut-through transfer, even if an error is found in a packet during transferring, the transfer of the packet cannot be cancelled. Thus, it is necessary to notify the node 10 of the destination of the packet that the error is included in the packet which is being currently transferred. In order to provide notification that the error occurred, the EDB is written into the END code of the error-included packet and the error check code is bit-inverted.

Figure 8A:
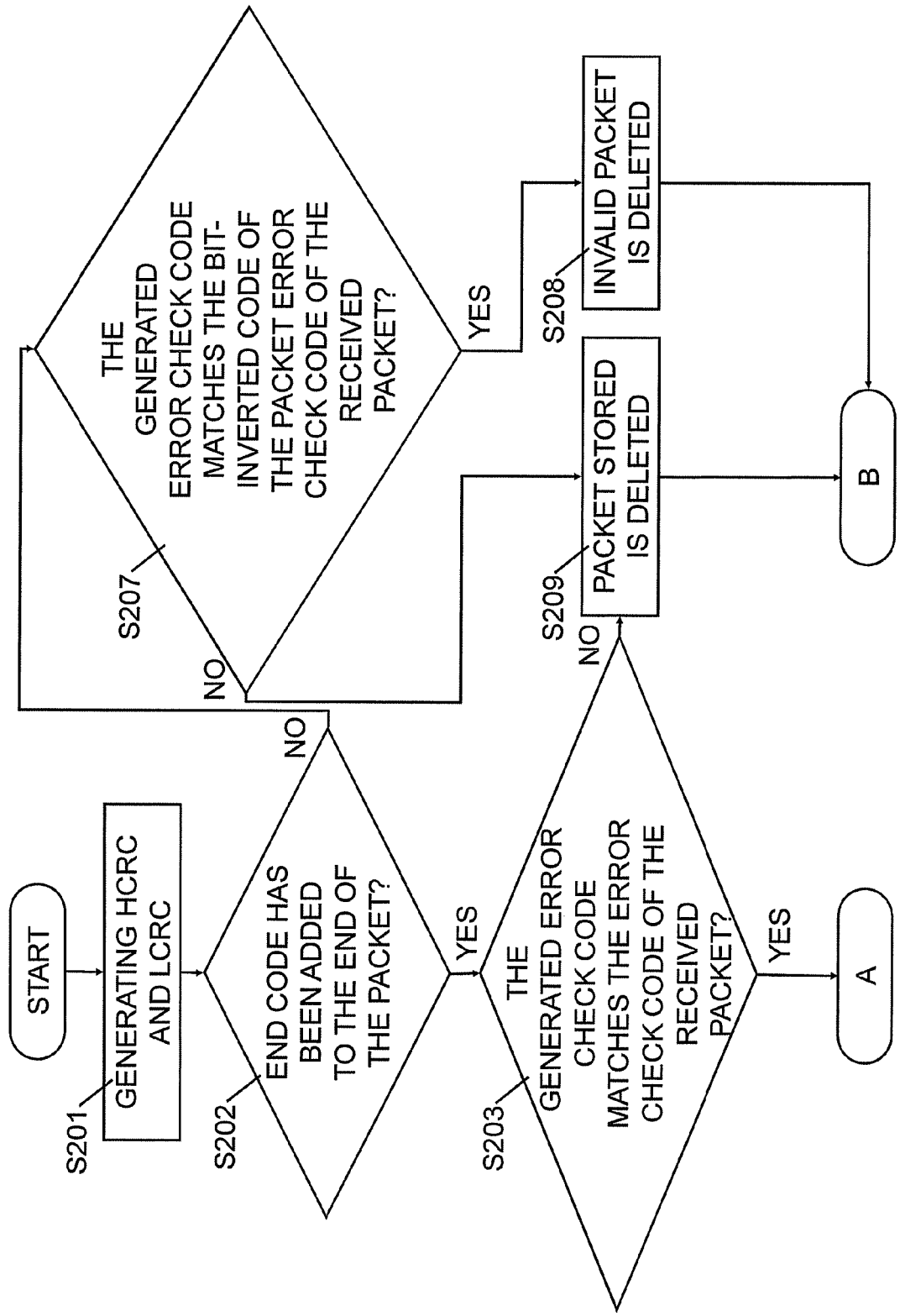
FIGS. 8A and 8B are flowcharts showing a receiving process in the first embodiment.
Figure 8B:
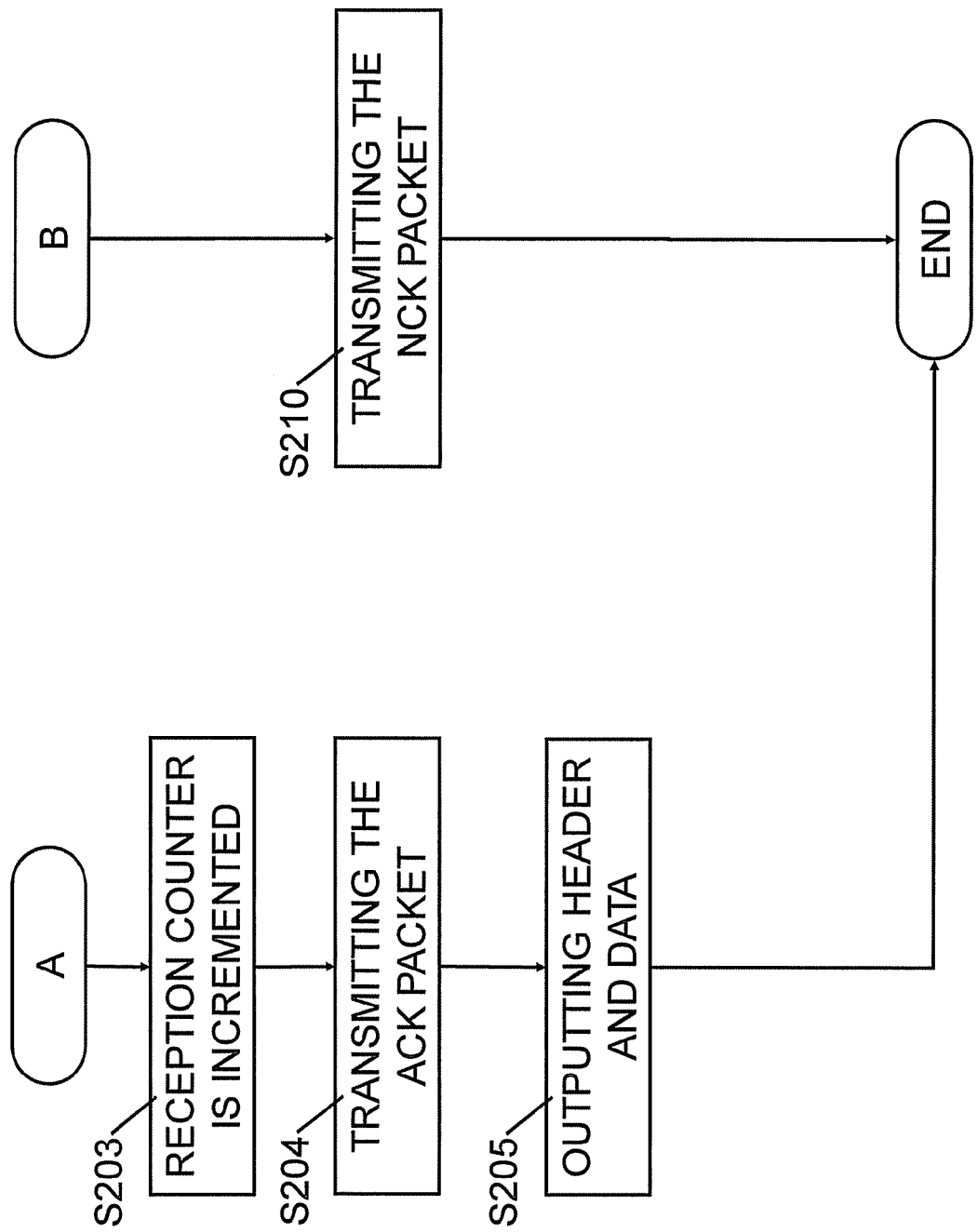

A packet receiving process will be described with reference to FIGS. 8A and 8B. At step S201, the header error check code generating circuit 204 and the packet error check code generating circuit 203 respectively generates the header error check code and the packet error check code. Then, the process proceeds to step S202.

At step S202, the receiving circuit 302 judges whether the END code has been added to the end of the packet concerned or not. When the END code has been added to the end of the packet, the process proceeds to step S203. While, when the END code has not been added to the end of the packet, the process proceeds to step S207.

At step S203, each of the header error check code comparing circuit 310 and the packet error check code comparing circuit 306 judges whether the error check code generated at step S201 matches the error check code of the received packet or not. When the generated error check code matches the error check code of the received packet, the process proceeds to step S204. While, when the generated error check code does not match the error check code of the received packet, the process proceeds to step S209. At step S209, the packet stored in the buffer 304 is deleted.

At step S204, the header error check code comparing circuit 310 outputs the signal indicative of matching of these error check codes to the sequence number controlling circuit 308. Then, the reception counter 305 is incremented and the process proceeds to step S205.

At step S205, the header error check code comparing circuit 310 transmits the ACK packet indicating that the normal packet has been received to the sequence number controlling circuit 207 of the packet transmitting circuit 200. When the ACK packet has been received by the sequence number controlling circuit 207, the second transmission counter 206 is incremented. Then, the process proceeds to step S206.

At step S206, the buffer 304 outputs the header and the data. Thus, the process is completed.

The process performed when the flow proceeds from step S202 to step S207 will be described. At step S207, the packet error check code comparing circuit 306 judges whether the packet error check code generated by the packet error check code generating circuit 203 matches the bit-inverted code of the packet error check code of the packet received by the receiving circuit 302 or not. When the generated packet error check code matches the bit-inverted code of the received packet error check code, the packet received by the receiving circuit 302 is an invalid packet. Thus, the process proceeds to step S208. On the other hand, when the generated packet error check code does not match the bit-inverted code of the received packet error check code, the process proceeds to step S209.

At step S208, the invalid packet stored in the buffer 304 is deleted. Then, the process proceeds to step S210.

At step S210, the header error check code comparing circuit 310 instructs the re-transmission controlling circuit 312 to re-transmit the packet. The re-transmission controlling circuit 312 receives the instruction from the header error check code comparing circuit 310 and transmits the NAK packet indicating that the normal packet could not be received to the packet transmitting circuit 200 to request the packet transmitting circuit 200 to re-transmit the packet. Thus, the process is completed.

Figure 9:
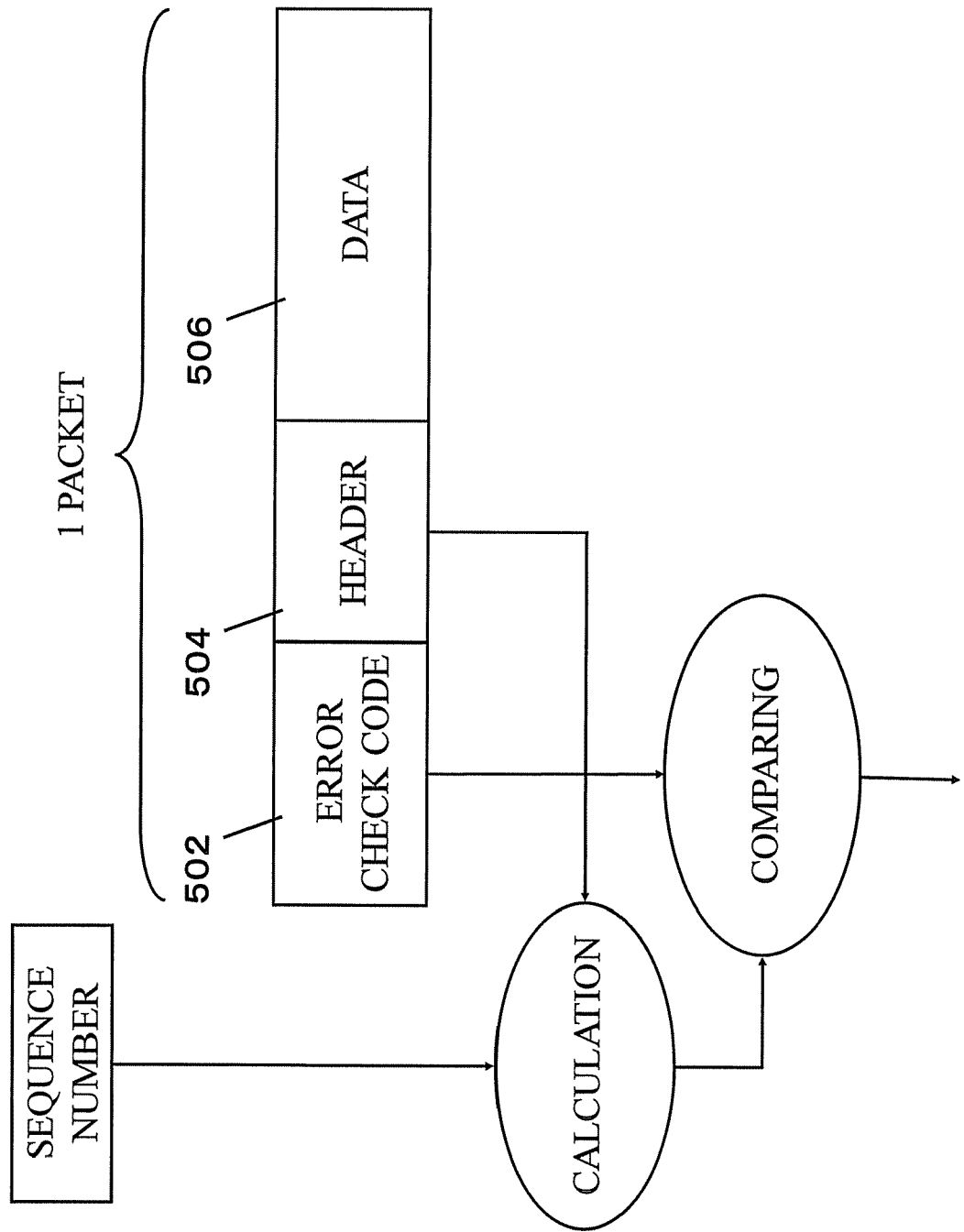
FIG. 9 is a diagram showing a checking method using the header error check code.

FIG. 9 is a conceptual diagram illustrating a header error and sequence number checking method in this embodiment. The header error check code used in this embodiment is generated from the sequence number held in the receiving circuit and the header of the received packet. Then, the generated header error check code is compared with the received header error check code. These two error check codes do not match each other when the sequence numbers do not match each other and an error is found in the header of the packet.

In the cut-through transfer, the transfer of the packet cannot be started unless the header is wholly acquired. Thus, it sometimes occurs that the header may not be wholly included in a received flit depending on data volume of the header concerned. If the header is not wholly included in the received flit, the header should be wholly acquired waiting until the next flit is received and hence the start of packet transfer will be delayed by the amount corresponding to a waiting time period required until the next flit is received. On the other hand, according to this embodiment, no sequence number is included in the header. Therefore, the data volume of the header can be reduced and hence the probability that the head can be included in the received flit can be increased.

Figure 10:
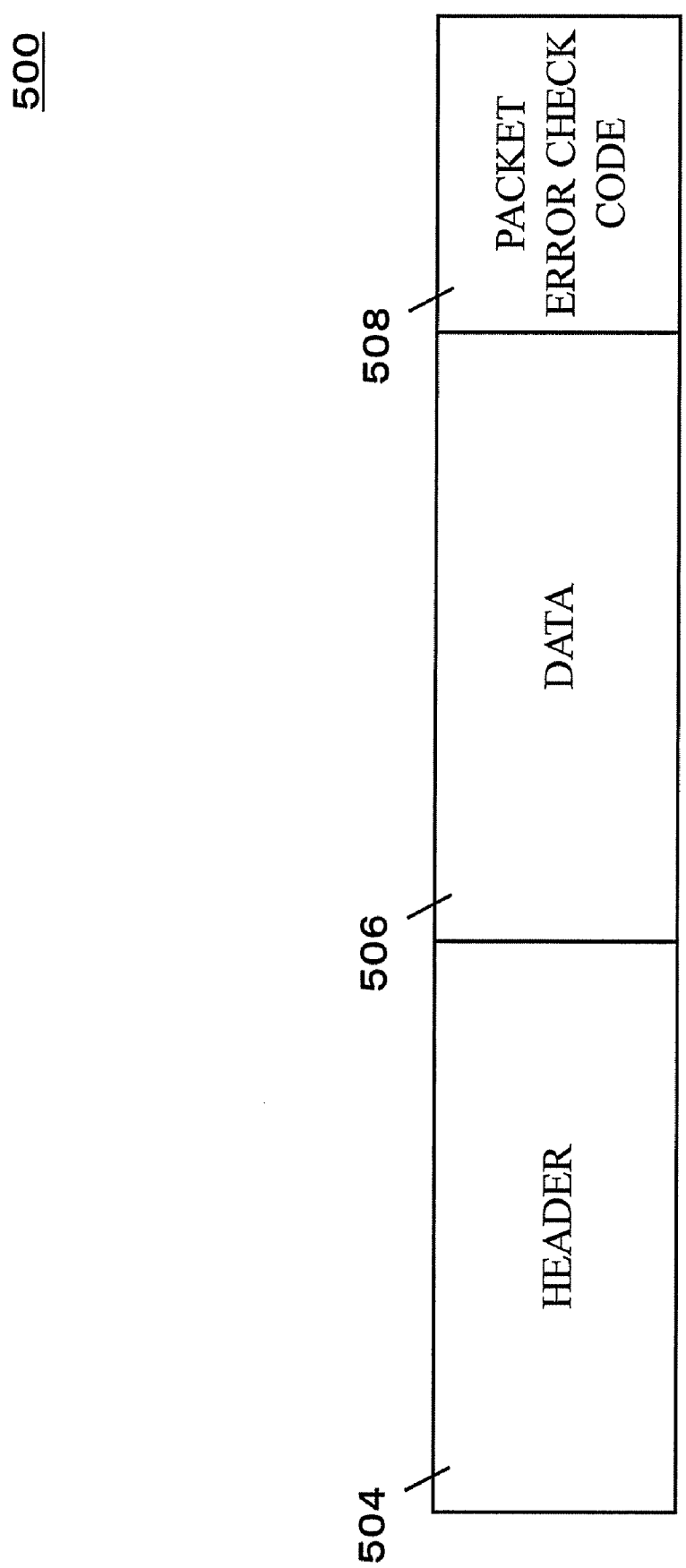
FIG. 10 is a diagram showing a packet format in a second embodiment.

Second Embodiment:

FIG. 10 shows a packet format of the packet 500 to be transmitted or received in this embodiment. The packet 500 includes the header 504, the data 506 and the packet error check code 508. The header 504 has information such as the address of the source from which the packet is transmitted, the address of the sink to which the packet is transmitted, the packet type and the packet length.

Figure 11:
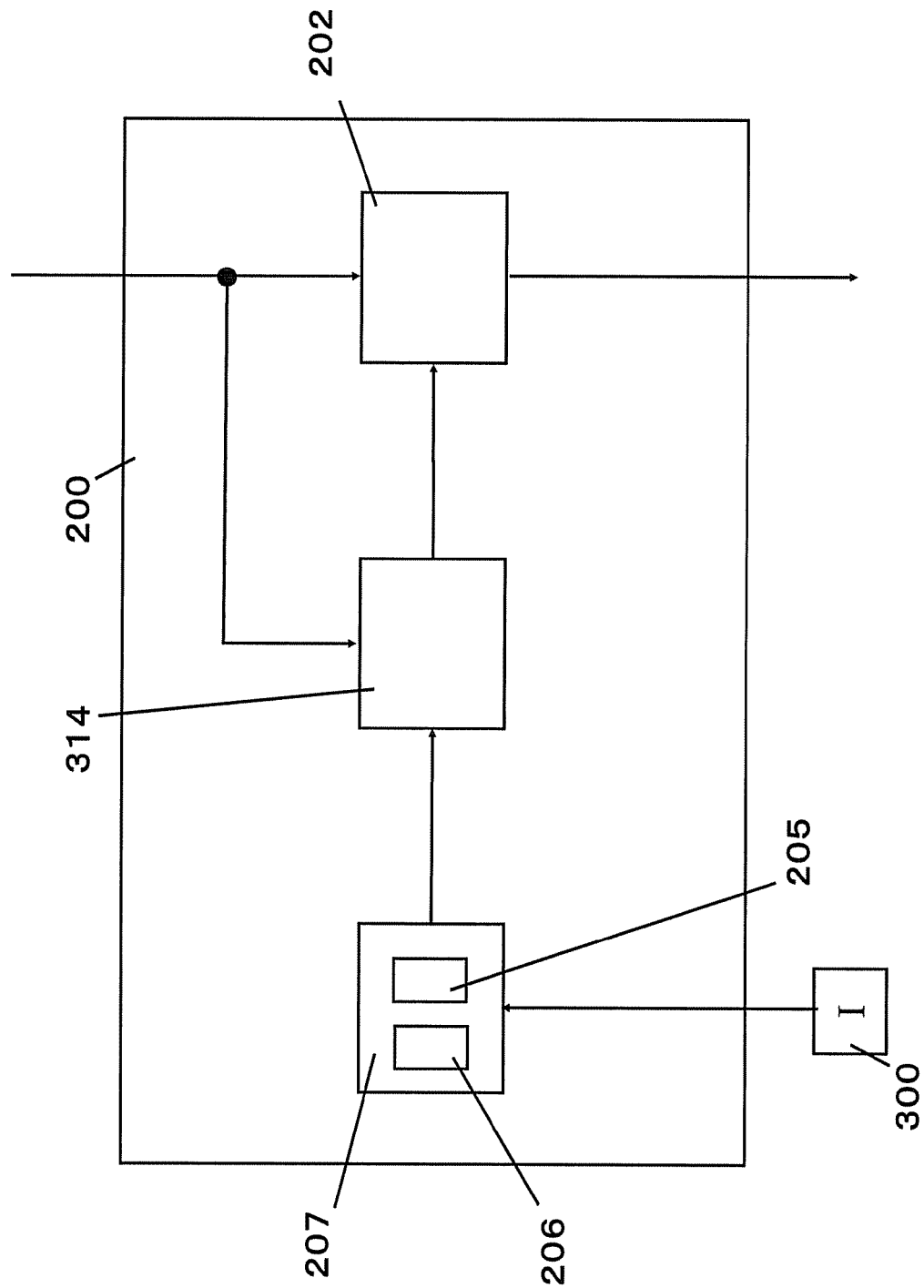
FIG. 11 is a structural diagram of a transmitting circuit in the second embodiment.

FIG. 11 shows a structure of the packet transmitting circuit 200 according to this embodiment. The packet transmitting circuit 200 includes the transmitting circuit 202, a packet error check code generating circuit 314 and the transmission sequence number controlling circuit 207. The transmission sequence number controlling circuit 207 has the first transmission counter 205 for managing the sequence number of the packet to be transmitted next and the second transmission counter 206 for managing the sequence number of the packet that the sink could normally receive.

Figure 12:
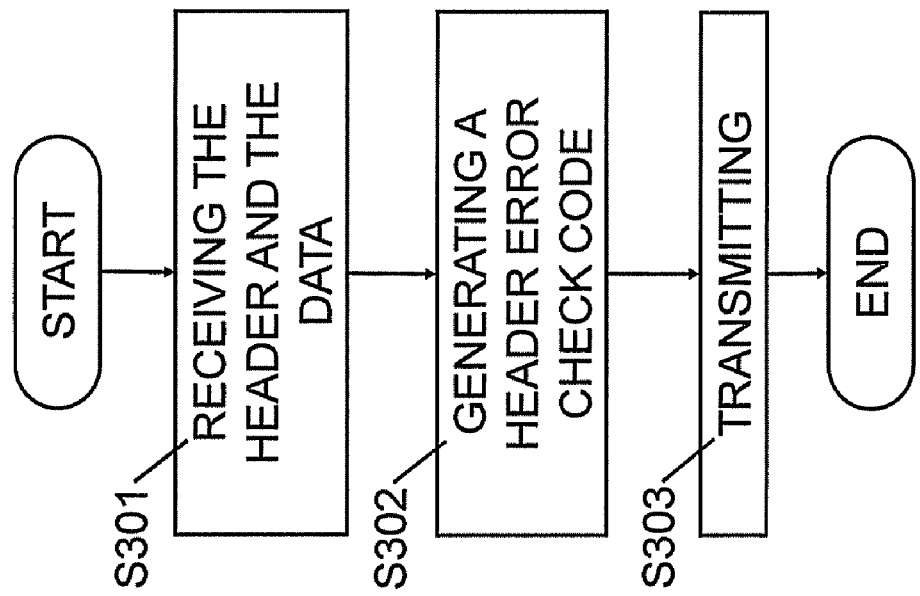
FIG. 12 is a flowchart showing a transmitting process in the second embodiment.

Next, a packet transmitting process will be described with reference to FIG. 12. At step S301, the transmitting circuit 202 receives the header and the data transmitted from the node 10. The process proceeds to step S302.

At step S302, the packet error check code generating circuit 314 generates a header error check code from the sequence number indicated by the first transmission counter 205 and the header and the data received by the transmitting circuit 202. As an algorithm for generating the packet error check code by the packet error check code generating circuit 314, a given algorithm such as a CRC algorithm may be used. The process proceeds to step S303.

At step S303, the transmitting circuit 202 transmits the packet error check code, the header and the data to the network 30 in accordance with the packet format, by which the process is completed.

Figure 13:
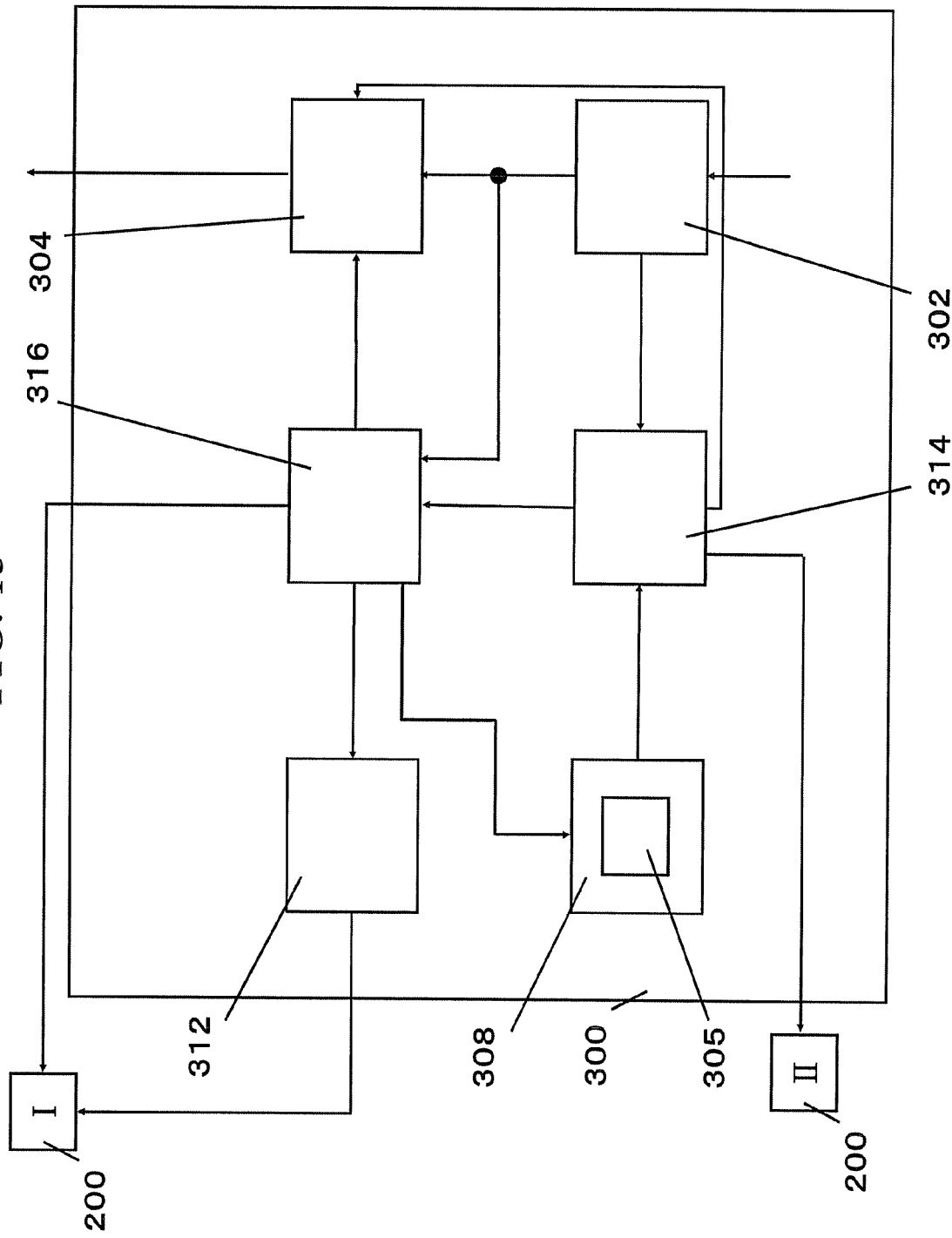
FIG. 13 is a structural diagram of a receiving circuit in the second embodiment.

FIG. 13 shows a structure of the packet receiving circuit 300 according to this embodiment. The packet receiving circuit 300 includes the receiving circuit 302, the buffer 304, the packet error check code generating circuit 314, the sequence number controlling circuit 308, a packet error check code comparing circuit 316 and the re-transmission controlling circuit 312. The sequence number controlling circuit 308 has the reception counter 305.

Figure 14A:
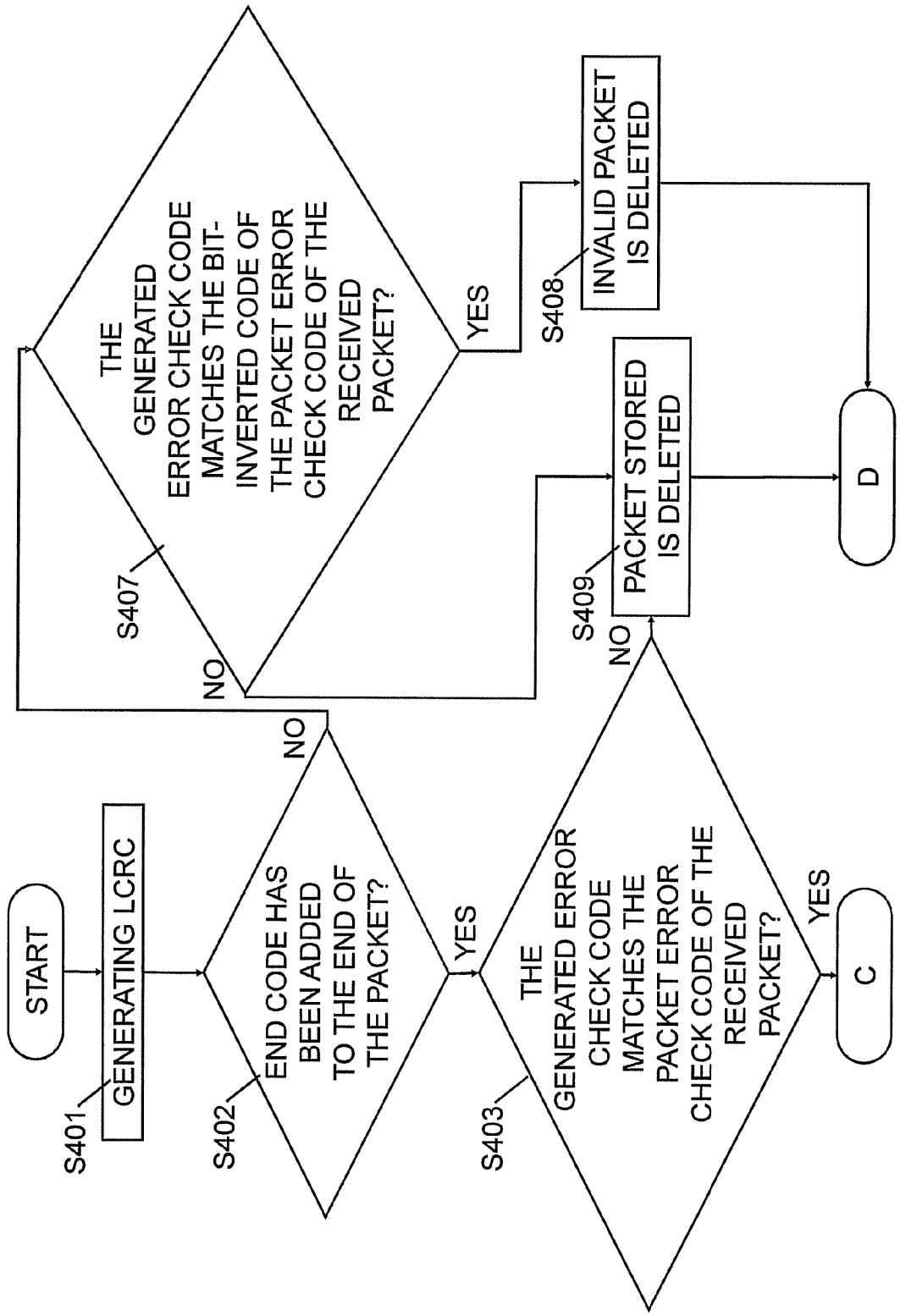
FIGS. 14A and 14B are flowcharts showing a receiving process in the second embodiment.
Figure 14B:
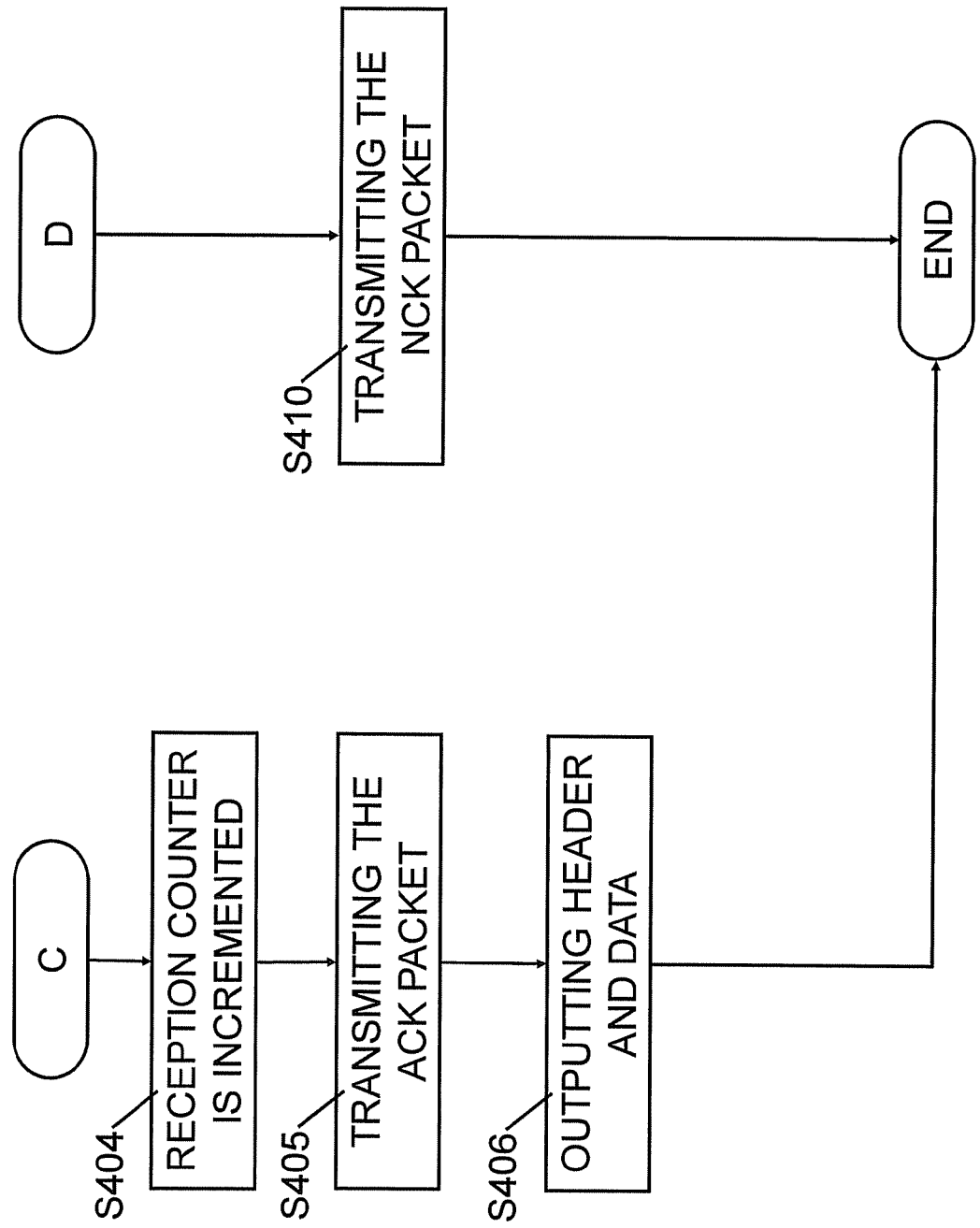

Next, a packet receiving process will be described with reference to FIGS. 14A and 14B. At step S401, the packet error check code generating circuit 314 generates a packet error check code. The process proceeds to step S402.

At step S402, the receiving circuit 302 judges whether an END code has been added to the end of the packet or not. When the END code has been added to the end of the packet, the process proceeds to step S403. While, when the END code has not been added to the end of the packet, the process proceeds to step S407.

At step S403, the packet error check code comparing circuit 316 judges whether the packet error check code generated at step S401 matches the packet error check code of the received packet. When the generated packet error check code matches the packet error check code of the received packet, the process proceeds to step S404. While, when the generated packet error check code does not match the packet error check code of the received packet, the process proceeds to step S409. At step S409, the packet stored in the buffer 304 is deleted.

At step S404, the packet error check code comparing circuit 316 outputs a signal indicating that these packet error check codes match each other to the sequence number controlling circuit 308. Thus, the reception counter 305 is incremented and the process proceeds to step S405.

At step S405, the packet error check code comparing circuit 316 transmits an ACK packet indicating that the normal packet has been received to the sequence number controlling circuit 207 of the packet transmitting circuit 200. When the sequence number controlling circuit 207 receives the ACK packet, the second transmission counter 206 is incremented and the process proceeds to step S406.

At step S406, the buffer 304 outputs the header and the data, by which the process is completed.

Next, the process performed when the flow proceeds from the step S402 to step S407 will be described. At step S407, the packet error check code comparing circuit 316 judges whether the packet error check code generated by the packet error check code generating circuit 314 matches a bit-inverted code of the packet error check code of the packet received by the receiving circuit 302 or not. When the generated packet error check code matches the bit-inverted code of the packet error check code of the received packet, the packet received by the receiving circuit 302 is an invalid packet and hence the process proceeds to step S408. While, when the generated packet error check code does not match the bit-inverted code of the packet error check code of the received packet, the process proceeds to step S409.

At step S408, the invalid packet stored in the buffer 304 is deleted. Then, the process proceeds to step S410.

At step S410, the packet error check code comparing circuit 316 instructs the re-transmission controlling circuit 312 to re-transmit the packet. The re-transmission controlling circuit 312 receives the instruction from the packet error check code comparing circuit 316. The re-transmission controlling circuit 312 transmits an NAK packet indicating that the normal packet could not be received to the packet transmitting circuit 200 to request the packet transmitting circuit 200 to re-transmit the packet, by which the process is completed.

Figure 15:
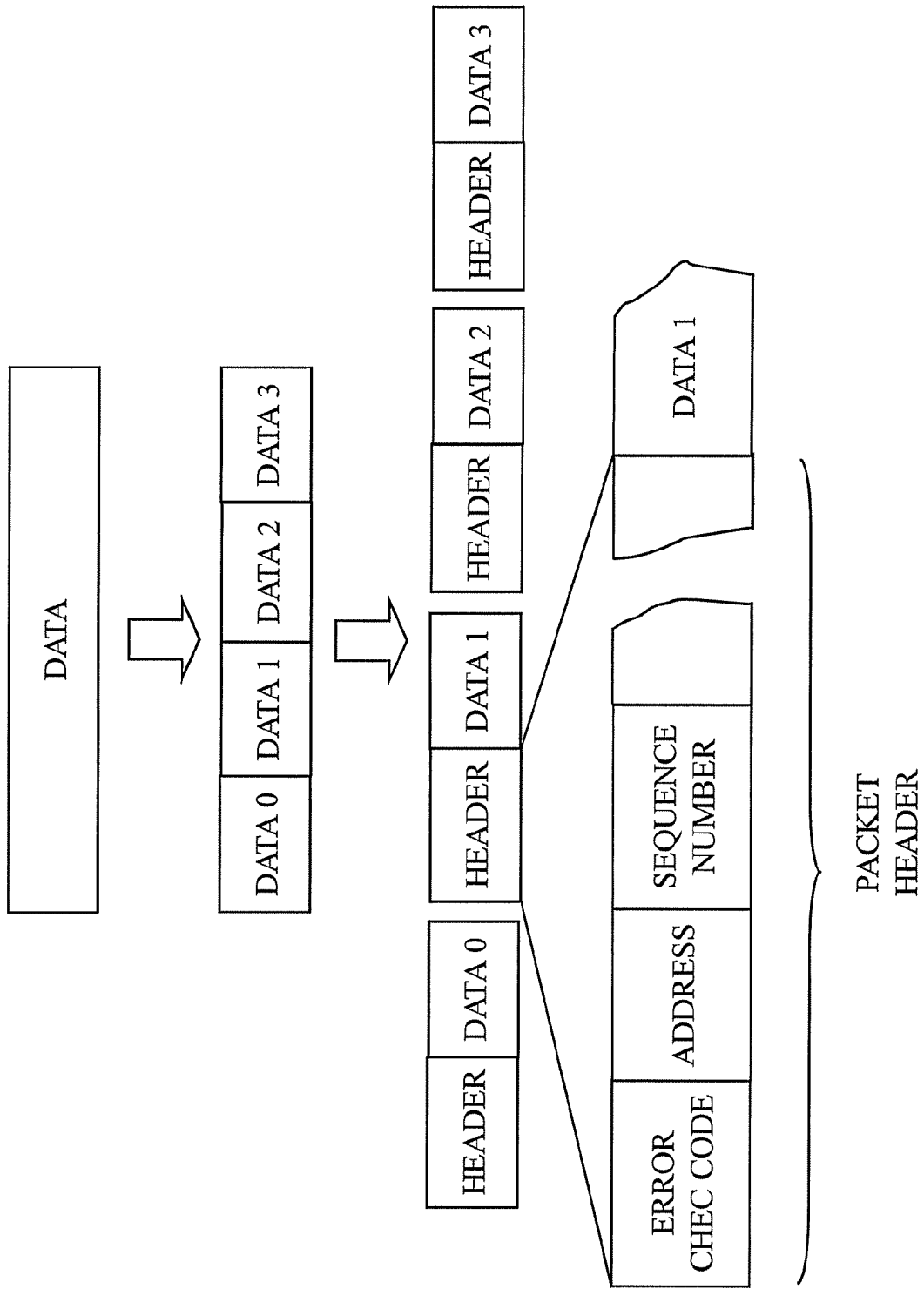
FIG. 15 is a diagram showing correspondence between transmission/reception data and a packet structure.

FIG. 15 shows correspondence between the data to be transmitted or received and the packet structure. As shown in FIG. 15, the packet is the data in which the information called the header is added to each divided data. In the packet shown in FIG. 15, the sequence number is included in the header. In the transmitting/receiving circuit in this embodiment, control is performed such that the sequence number of the packet transmitted from the transmitting circuit matches the sequence number of the packet received by the receiving circuit. Therefore, if the error check codes are generated by using the sequence numbers respectively managed by the transmitting circuit and the receiving circuit, it will become unnecessary to include the sequence number in the packet. As a result, effective utilization of the communication band width of the transmitting/receiving can be realized.

As mentioned above, the present invention has been specifically described for better understanding of the embodiments thereof and the above description does not limit other aspects of the invention. Therefore, the present invention can be altered and modified in a variety of ways without departing from the gist and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A data transfer apparatus coupled to an other data transfer apparatus, the data transfer apparatus comprising:
    a transmitter that transmits a sequence of a plurality of packets each including a header and data to a receiver of the other data transfer apparatus, the transmitter comprising:
        a first counter that counts a first sequence number of the plurality of packets to be transmitted to the receiver of the other data transfer apparatus;
        a first generating unit that generates an error check code for checking an error in each packet on the basis of the header and the data in each packet and a first sequence number corresponding to each packet; and
        a transmitting unit that transmits each packet with each generated error check code to the receiver of the other data transfer apparatus; and
    a receiver that receives a plurality of packets transmitted from a transmitter of the other data transfer apparatus, the receiver comprising:
        a second counter that counts a second sequence number of the plurality of packets received from the transmitter of the other data transfer apparatus;
        a second generating unit that generates an error check code for checking an error in each packet on the basis of the header and the data in each packet received from the transmitter of the other data transfer apparatus and the second sequence number corresponding to each packet; and
        an error check unit that checks an error in the sequence of the plurality of packets by comparing the error check code generated by the second generating unit and each error check code transmitted with each packet from the transmitter,
        wherein the error check unit requests the transmitter to retransmit the packet when the error check code generated by the second generating unit does not match the error check code transmitted with each packet from the transmitter of the other data transfer apparatus.

2. The data transfer apparatus of claim 1, wherein
    the error check unit controls the first counter so as to increment the first sequence number and the second counter so as to increment the second sequence number when the error check code generated by the second generating unit matches the error check code transmitted with each packet from the transmitter of the data transfer apparatus.

3. A control method for a first data transfer apparatus coupled to a second data transfer apparatus of, the control method comprising:
   counting a first sequence number of the plurality of packets to be transmitted to the receiver of the second data transfer apparatus by a first counter of the first data transfer apparatus;
   generating an error check code for checking an error in each packet on the basis of the header and the data in each packet and a first sequence number corresponding to each packet by a first generating unit of the first data transfer apparatus;
   transmitting each packet with each generated error check code to the receiver of the other data transfer apparatus by a transmitting unit of the first data transfer apparatus;
   counting a second sequence number of the packets received from the transmitter of the other data transfer apparatus by a second counter of the second data transfer apparatus;
   generating an error check code for checking an error in each packet on the basis of the header and the data in each packet received from the transmitter of the other data transfer apparatus and the second sequence number corresponding to each packet by a second generating unit of the second data transfer apparatus; and
   checking an error in the sequence of the plurality of packets by comparing the error check code generated by the second generating unit and each error check code transmitted with each packet from the transmitter by a an error check unit of the second data transfer apparatus,
   wherein retransmitting the packet is requested at the transmitting by the transmitting unit of the first data transfer apparatus when the error check code generated by the second generating unit does not match the error check code transmitted with each packet from the transmitter of the second data transfer apparatus.

4. The control method of claim 3, wherein
   the first counter is controlled so as to increment the first sequence number by the error check unit and the second counter is controlled so as to increment the second sequence number by the error check unit when the error check code generated at the generating matches the error check code transmitted with each packet from the transmitter of the other data transfer apparatus.

5. A data transfer system including a data transfer apparatus and an other data transfer apparatus coupled to each other, the data transfer apparatus comprising:
   a transmitter that transmits a sequence of a plurality of packets each including a header and data to a receiver of the other data transfer apparatus, the transmitter comprising:
      a first counter that counts a first sequence number of the plurality of packets to be transmitted to the receiver of the other data transfer apparatus;
      a first generating unit that generates an error check code for checking an error in each packet on the basis of the header and the data in each packet and a first sequence number corresponding to each packet; and
      a transmitting unit that transmits each packet with each generated error check code to the receiver of the other data transfer apparatus;
   and
   a receiver that receives a plurality of packets transmitted from a transmitter of the other data transfer apparatus, the receiver comprising:
      a second counter that counts a second sequence number of the plurality of packets received from the transmitter of the other data transfer apparatus;
      a second generating unit that generates an error check code for checking an error in each packet on the basis of the header and the data in each packet received from the transmitter of the other data transfer apparatus and the second sequence number corresponding to each packet; and
      an error check unit that checks an error in the sequence of the plurality of packets by comparing the error check code generated by the second generating unit and each error check code transmitted with each packet from the transmitter,
      wherein the error check unit requests the transmitter to retransmit the packet when the error check code generated by the second generating unit does not match the error check code transmitted with each packet from the transmitter of the other data transfer apparatus.

* * * * *

UNITED STATES PATENT AND TRADEMARK OFFICE
CERTIFICATE OF CORRECTION

PATENT NO. : 8,255,560 B2
APPLICATION NO. : 12/485529
DATED : August 28, 2012
INVENTOR(S) : Tomohiro Inoue et al.

It is certified that error appears in the above-identified patent and that said Letters Patent is hereby corrected as shown below:

In the Claims:

Column 11, Line 33, In Claim 3, after "by" delete "a".

Signed and Sealed this
Twenty-first Day of May, 2013

Teresa Stanek Rea
*Acting Director of the United States Patent and Trademark Office*